3,140,994
METHOD OF REDUCING NITROGEN TO NOT MORE THAN 1 P.P.M. IN REFORMER FEED

Walter Rodman Derr, Jr., Ashland, and Julius Plucker III, Pitman, N.J., assignors to Socony Mobil Oil Company, Inc., a corporation of New York
No Drawing. Filed July 12, 1961, Ser. No. 123,421
15 Claims. (Cl. 208—254)

The present invention relates to the removal of nitrogen in reformer feed stocks containing more than 10 p.p.m. of nitrogen, and, more particularly, to a method of presulfiding catalysts comprising oxides of cobalt and molybdenum to increase the capability thereof for the removal of nitrogen in excess of 10 p.p.m. and the method of hydrodecontaminating reformer feed containing more than 10 p.p.m. of nitrogen to provide a reformer feed containing not more than 1 p.p.m. of nitrogen. (p.p.m. is an abbreviation for parts per million by weight.)

The deleterious effects of nitrogen and sulfur in platinum reforming have been recognized. Both contaminants deactivate the costly platinum catalyst and in some cases even cause losses in yields. Of these contaminants nitrogen is the more difficult to remove. This is evident from the data set forth in Table I.

sulfur is removed from the naphtha by fresh or "aged" catalyst with much greater ease than nitrogen.

In view of the data presented in Table I it is surprising to find that when an active hydrogenation catalyst comprising a mixture of oxides of cobalt and molybdenum on alumina support and having hydrodenitrogenizing capabilities is presulfided under critically controlled conditions the capability to remove nitrogen is increased to the extent the feed naphtha having nitrogen concentrations of the order of 13 p.p.m. can be treated under the same, relatively mild conditions to provide a reformer feed containing not more than 1 p.p.m. of nitrogen.

The importance of the discovery that under critically controlled conditions "cobalt-moly" hydrodesulfurizing catalyst can be presulfided to provide a catalyst which will reduce the nitrogen content of 15 p.p.m. of a blend of 20 percent coker gasoline and 80 percent straight run gasoline to 1 p.p.m. while the unsulfided catalyst will reduce the nitrogen content of a blend to 1 p.p.m. only when the blend contains 13 percent of coker gasoline is appreciated from the following:

In an integrated refinery designed to produce 2,000 b./d. of coker gasoline, and 8,000 b./d. of straight run gasoline there is an imbalance of 800 b./d of coker gasoline when unpresulfided catalyst is used for hydrodecon-

Table I

Feed—Naphtha blend:
  Nitrogen content—13 p.p.m. by weight
  Sulfur content—600 p.p.m. by weight
Hydrodecontaminating conditions:
  Catalyst—various; each mixture of oxides of cobalt and molybdenum on alumina
  Pressure, p.s.i.g.—425
  Temperature, ° F.—675
  Liquid hourly space velocity, $V_n/hr./V_c$ (LHSV)—5.0
  Hydrogen, s.c.f./bbl.—500

| Catalyst No. | Sulfur on Catalyst, Percent by Weight | | Sulfur wt. Percent Aged/ Sulfur wt. Percent Fresh | Nitrogen in Product After Contact With— | | Percent Nitrogen Removed | | Sulfur in Product After Contact With— | | Percent Sulfur Removed | |
|---|---|---|---|---|---|---|---|---|---|---|---|
| | As Received | "Aged"[1] | | Fresh Catalyst | "Aged"[1] Catalyst | Fresh Catalyst | "Aged"[1] Catalyst | Fresh Catalyst | "Aged"[1] Catalyst | Fresh Catalyst | "Aged"[1] Catalyst |
| 1 | 0.12 | 5.03 | 41.9 | 1.6 | 1.8 | 87.7 | 86.2 | 4 | 4 | 99.3 | 99.3 |
| 2 | 0.16 | 3.93 | 24.6 | 1.6 | 1.7 | 87.7 | 86.9 | 9 | 5 | 98.5 | 99.2 |
| 3 | 0.06 | 4.41 | 73.5 | 1.4 | 2.5 | 89.2 | 80.8 | | 11 | | 98.2 |
| 4 | 0.43 | 4.22 | 9.8 | 3.0 | 3.5 | 76.9 | 73.1 | | 11 | | 98.2 |
| 5 | 0.26 | 3.28 | 12.6 | 3.0 | 5.1 | 76.9 | 60.8 | 10 | 5 | 98.3 | 99.2 |
| 6 | 1.06 | 5.30 | 5.0 | 3.5 | 4.4 | 73.1 | 66.2 | | 26 | | 95.7 |
| 7 | 0.05 | 3.98 | 79.6 | | 4.7 | | 63.8 | | 3 | | 99.5 |

[1] In contact with a blend of coker (10%) and straight run (90%) naphthas for two months at 700° F., 5.0 LHSV, 450–500 p.s.i.g., and 500 s.c.f./bbl. of $H_2$-rich (70–80% vol.) gas, single-pass.

Inspection of the data presented in Table I establishes the following facts: (1) the sulfur content of all of the "aged" catalysts was raised to at least five times and as much as eighty times the sulfur content of the fresh catalyst; (2) about 73 to about 89 percent of the nitrogen was removed with fresh catalyst whereas 98 to 99 percent of the sulfur was removed with fresh catalyst; (3) about 61 to about 87 percent of the nitrogen was removed with "aged" catalyst whereas 96 to 99.5 percent of the sulfur was removed with "aged" catalyst; (4) while the amount of nitrogen removed with "aged" catalyst is not greater and in about 60 percent of the cases less than the amount of nitrogen removed with fresh catalyst, the amount of sulfur removed with "aged" catalyst is substantially the same as is removed with fresh catalyst; and (5)

tamination as is manifest from the numerical values set forth hereinafter.

| Feed Components | Nitrogen in Feed, p.p.m. | Catalyst | Nitrogen in Product, p.p.m. |
|---|---|---|---|
| Coker Gasoline, 1,200 b./d. | 75 | | |
| Straight Run Gasoline, 8,000 b./d. | Nil | | |
| Blend, 9,200 b./d. | 10 | CoO-MoO | 1 |
| Excess Untreated Coker Gasoline, 800 b./d. | 75 | | |
| Coker Gasoline 2,000 b./d. | 75 | | |
| Straight Run Gasoline: | | | |
| 8,000 b./d. | Nil | Critically controlled presulfided. | |
| 10,000 b./d. | 15 | CoO-MoO | 1 |

In other words, untreated coker gasoline piles up at the rate of 800 b./d. unless the coker is operated at below design capacity, additional facilities are built, or other means devised to upgrade the high-sulfur, high-nitrogen coker gasoline which does not satisfy the requirements of the specification for the lowest grade of marketable gasoline.

The sulfur content of the hydrogenation catalyst is not a criterion of the effectiveness of the sulfur-bearing catalyst for the hydrogenative removal of nitrogen as is manifest from the data presented in Table I. The lack of correlation between the sulfur content of cobalt-moly hydrogenation catalysts and the effectiveness of the sulfur-bearing catalyst for hydrogenative removal of nitrogen is further attested by the data presented in Table II.

*Table II*

[Presulfiding conditions: Contacted for 12 hours with naphtha containing two percent by weight of sulfur as thiophene or carbon disulfide at 675° F. under a pressure of 425 p.s.i.g. at LHSV of 5 while circulating 500 s.c.f. of hydrogen per barrel of naphtha]

| Catalyst Designation | Wt. percent Co | Wt. percent Mo | Wt. percent [1] S | Nitrogen Content of Test Naphtha, p.p.m. | Nitrogen Content of Treated Test Naphtha, p.p.m. [1] |
|---|---|---|---|---|---|
| A | 3.3 | 16.1 | 4.7 | 13 | 0.8 |
| B | 2.7 | 15.0 | 5.8 | 13 | 1.4 |
| C | 3.0 | 9.5 | 3.9 | 13 | <0.2 |
| D | 3.4 | 11.3 | 4.4 | 13 | 0.2 |
| E | 3.1 | 9.2 | 3.3 | 13 | 1.2 |
| G [2] | <1.0 | 6.0 | 4.0 | 13 | 0.3 |
| H [3] | 0.0 | 10.0 | | 13 | 3.7 |

[1] After 3 days on-stream.  [2] Ni-Mo-Al$_2$O$_3$.  [3] Cr-Mo-Al$_2$O$_3$.

Thus, it is manifest that the only present means for evaluating the effectiveness of a catalyst for the removal of nitrogen under hydrodenitrogenizing conditions is a hydrodenitrogenizing test made under standard conditions.

TEST FOR CATALYST EFFECTIVENESS IN THE REMOVAL OF NITROGEN

Since small differences in the effectiveness of a catalyst in removing nitrogen under test conditions are more readily detected when the test feed has a high nitrogen content of at least 90 p.p.m., the test blend, preferably a mixture of coker gasoline and straight run gasoline, is prepared to provide a feed stock containing about 95 to about 105 p.p.m. of nitrogen. The test blend is hydrodecontaminated employing the catalyst to be tested in the unpresulfided state and in the presulfided state and the improvements in the nitrogen content of the product are compared. The test conditions are:

Pressure, p.s.i.g. ------------------------------ 425
Temperature, ° F. ----------------------------- 675
Liquid hourly space velocity, v./hr./v. (LHSV) --- 5.0
Hydrogen (100% circulation, s.c.f./b. ---------- 500

Illustrative of the procedure are the following data. (Each of the catalysts was tested in the condition indicated under the test conditions set forth hereinbefore.)

*Table III*

| Catalyst Designation | Condition | Nitrogen Charge | Content, p.p.m. Product |
|---|---|---|---|
| VII-1 | As received | 96 | 31 |
| VII-2 | Sulfided [1] | 97 | 15 |
| VIII-1 | As received | 96 | 35 |
| VIII-2 | Sulfided [1] | 97 | 26 |

[1] Both catalysts sulfided by the same method.

There can be no doubt that catalyst VII-2 is more effective in reducing the nitrogen content of the test blend. This is proven by a test under the same conditions using as a test blend a mixture having a nitrogen content of about 13 p.p.m. The superiority of catalyst VII-2 is established by the following data:

*Table IV*

| Catalyst Designation | Condition | Nitrogen Charge | Content, p.p.m. Product |
|---|---|---|---|
| VII-2 | Sulfided | 13 | 0.8 |
| VII-1 | As received | 13 | 1.6 |

By comparing the results tabulated for each of the catalysts in Tables III and IV it is readily recognized that a catalyst presulfided under critically controlled conditions, which under standard hydrodenitrogenizing conditions reduces the nitrogen content of the product by at least 40 percent of the nitrogen of the product produced under standard hydrodenitrogenizing conditions, will reduce the nitrogen content of a feed naphtha containing 15 p.p.m. of nitrogen to not more than 1 p.p.m. of nitrogen in the product under mild hydrodenitrogenizing conditions of temperature within the range of about 650° to 750° F., pressure within the range of about 400 to 600 p.s.i.g., LHSV in the range of about 2 to 5, and hydrogen circulation rate of about 400–1000 s.c.f. per barrel of hydrodecontaminator feed.

The present invention provides a means for presulfiding a hydrogenation catalyst having capabilities of hydrodesulfurizing and hydrodenitrogenizing mixtures of hydrocarbons such as naphthas, kerosene, and domestic heating oil wherein the presulfiding conditions are critically controlled to provide a presulfided catalyst which under the test conditions set forth hereinbefore reduces the nitrogen content of the hydrodecontaminated product at least 40 percent more than the unpresulfided catalyst. In general, the presulfiding of a catalyst of the aforedescribed class is accomplished at temperatures within the range of about 650° to about 800° F., at pressure within the range of about 100 to about 1000 p.s.i.g., and at partial pressures of sulfur expressed as hydrogen sulfide of at least 7.4 p.s.i.a.

At least three presulfiding techniques have been found to provide satisfactory activation of catalysts comprising mixtures of oxides of cobalt and molybdenum on a refractory oxide carrier such as alumina.

Thus, a "cobalt-moly" catalyst having hydrogenating, hydrodesulfurizing and hydrodenitrogenizing capabilities was contacted for five hours with naphtha into which hydrogen sulfide was injected at the rate of 40 s.c.f./bbl. and in the presence of about 500 s.c.f. of hydrogen per barrel of naphtha (500 s.c.f. H$_2$/b.). The "cobalt-moly" catalyst was contacted with the mixture of naphtha, hydrogen sulfide, and hydrogen under a total reactor pressure of about 225 to 250 p.s.i.g., and a hydrogen sulfide partial pressure of approximately 7.4 p.s.i.a. at a liquid hourly space velocity (LHSV of naphtha) of 2 and at a temperature of about 675° to 725° F. Thus, the "cobalt-moly" catalyst designated VII-1 in Tables III and IV was treated for presulfiding under the conditions set forth in Table V, Section A, and tested for effectiveness in the removal of nitrogen under the conditions and with the results set forth in Table V, section B.

Table V

SECTION A

[Treating medium: Blend of coker and straight run naphtha containing 0.18 weight percent sulfur and 85 p.p.m. of nitrogen]

Activating conditions:
- Temperature, °F. _____ 675
- Pressure, p.s.i.g. _____ 225
- Naphtha LHSV _____ 2
- Hydrogen, s.c.f./bbl. _____ 500
- Sulfiding agent, $H_2S$, s.c.f./bbl. _____ 38.6
- $H_2S$, partial pressure, at reactor inlet, p.s.i.a. __ 7.4
- Time of contact, hrs. _____ 5.0

The presulfided catalyst was tested for effectiveness for hydrodenitrogenizing reformer feed naphtha containing 96 p.p.m. of nitrogen under the conditions set forth in Section B.

Table V

SECTION B

- Temperature, °F. _____ 675
- Pressure, p.s.i.a. _____ 425
- LHSV _____ 5.0
- $H_2$ (100%) s.c.f./b. _____ 500
- On-stream, hrs. _____ 67
- Nitrogen, p.p.m.:
  - Charge _____ 96
  - Product _____ 21
- Sulfur, p.p.m.:
  - Charge _____ 1,840
  - Product _____ 3
- Sulfur on catalyst, percent weight _____ 4.9

The hydrodenitrogenizing capabilities can also be enhanced to an industrially satisfactory level by admixing with treating medium a liquid or oil soluble organic sulfur compounds such as thiophene, carbon disulfide, mercaptans, alkyl disulfides, and aryl disulfides. This method of catalyst activation is illustrated by the following:

Table VI

SECTION A

Treating medium: Blend of coker and straight run naphtha containing 0.18 weight percent sulfur and 96 to 101 p.p.m. of nitrogen
Activating conditions: Temperature, °F.—675; pressure, p.s.i.g.—425; hydrogen, s.c.f./bbl.—500
Sulfiding agent: (1) thiophene, (2) carbon disulfide
LHSV (naphtha): 4.4–5.0
$H_2S$ partial pressure, p.s.i.a.: 14.5–17.8

| Activating Run No. | Sulfiding Agent, wt. percent | Naphtha Sulfur, wt. percent | Naphtha Nitrogen, wt. percent | Sulfur on Catalyst, wt. percent | $H_2S$ Partial Pressure, p.s.i.a. | Sulfiding Time, Hours |
|---|---|---|---|---|---|---|
| 3 | Thiophene | 1.93 | 95 | 5.4 | 17.8 | 12 |
| 4 | $CS_2$ | 2.12 | 96 | 5.0 | 14.5 | 12 |

SECTION B

[Denitrogenizing conditions: Temperature, °F.—675; pressure, p.s.i.g.—425; hydrogen, s.c.f./bbl.—500; LHSV—5.0]

| Catalyst from Activating Run No. | Nitrogen Charge | Product, p.p.m. | Sulfur Charge | Product, p.p.m. | Sulfur on Catalyst, wt. percent |
|---|---|---|---|---|---|
| 3 | 97 | 13 | 2,400 | 4 | 5.4 |
| 4 | 97 | 15 | 2,040 | 5 | 5.0 |
| As received | 96 | 31 | 2,100 | 16 | 4.4 |

A "cobalt-moly" hydrogenating catalyst having hydrodesulfurizing and hydrodenitrogenizing capabilities can be treated to enhance the hydrodenitrogenizing capabilities thereof under the conditions set forth in Table VII, Section A, with the results tabulated in Table VII, Section B.

Table VII

SECTION A

| Catalyst No. | Media $H_2S$, vol. percent | $H_2$ vol. percent | $H_2S$, s.c.f.m./c.f. Catalyst | Pressure, p.s.i.g. | Partial Pressure, p.s.i.a. | Time | T, °F. |
|---|---|---|---|---|---|---|---|
| 14 | 100 | Nil | 0.06 | 100 | 114.7 | 16 | 650 |
| 15 | 50 | 50 | 1.00 | 0 | 7.4 | 5 | 800 |

SECTION B

| Catalyst No. | Nitrogen, p.p.m. Charge | Nitrogen, p.p.m. Product | Sulfur, p.p.m. Charge | Sulfur, p.p.m. Product | Sulfur on Catalyst, Percent Weight |
|---|---|---|---|---|---|
| Base | 96 | 31 | 2,100 | 16 | 4.4 |
| 14 | 101 | 19 | 2,100 | 7 | 6.2 |
| 15 | 101 | 20 | 2,100 | 5 | 6.2 |

The activation of catalysts of the type discussed hereinbefore is only capable of producing satisfactory enhancement of the hydrodenitrogenizing capabilities of the catalyst when virgin or freshly regenerated catalyst is treated. The response to activation is equal with freshly regenerated or virgin catalyst. Presulfiding does not improve the hydrodenitrogenizing capabilities of catalyst which has been aged and contains more than one percent of carbon. Furthermore, the sulfur content of the catalyst is not, per se, a criterion of effective activation. Naphthas containing relatively high concentrations of indigenous sulfur will in time convert most of the metal oxides of a "cobalt-moly" catalyst to sulfides; but the hydrodenitrogenizing capabilities of the catalyst is not improved. However, the presence of nitrogen in the activating medium does not inhibit effective enhancement of the hydrodenitrogenizing capabilities of the presulfided catalyst when presulfided under the critical conditions set forth herein.

The presulfided catalyst is stable and retains the original enhanced hydrodenitrogenizing capabilities.

Presently, the addition of carbon disulfide to the naphtha activating media is not preferred except when it can be used without substantial hazards. It is well known that carbon disulfide is a highly flammable and toxic material. When facilities are available to avoid these hazards, carbon disulfide is an excellent, cheap source of activating agent.

Hydrogen sulfide is commercially available in cylinders as a liquid at ambient temperatures of 70° to 80° F. The vapor pressure is 250 to 260 p.s.i.g. Thus, the hydrodenitrogenizing capabilities of "cobalt-moly" hydrogenating catalyst can be enhanced to a satisfactory level employing hydrogen sulfide at cylinder pressure.

A comparison of the effectiveness of various presulfiding agents and presulfiding conditions in increasing the capabilities of a hydrogenation catalyst having hydrosulfurizing and hydrodenitrogenizing capabilities is provided in Table VIII. (The effectiveness is rated as go-no go, i.e., an effectively presulfided catalyst reduces the nitrogen content of the product from control naphtha containing a control concentration of indigenous organic nitrogen compounds at least 40 percent more than the unpresulfided catalyst under standard testing conditions when the naphtha feed contains 90 to 105 p.p.m. of indigenous organic nitrogen compounds.)

Table VIII
SULFIDING TECHNIQUE

| Media | Naphtha Feed | | Pressure, p.s.i.g. | Temperature, °F. | LHSV | $H_2$, s.c.f./bbl. | $H_2S$, s.c.f./bbl. | Time, hrs. | $H_2S$ Partial Pressure, p.s.i.a. | Sulfur on Catalyst, percent Wt. | Effective Sulfiding | Run No. |
|---|---|---|---|---|---|---|---|---|---|---|---|---|
| | S, percent wt. | N, p.p.m. | | | | | | | | | | |
| S. R.* | 0.025 | Nil | 425 | 675 | 2.75 | 500 | Nil | 97 | 0.2 | 3.3 | No | 21 |
| Coker+S.R | 0.250 | 96 | 425 | 675 | 5.0 | 500 | Nil | 72 | 3.0 | 4.4 | No | 22 |
| Thiophene+S.R | 0.50 | Nil | 425 | 675 | 4.4 | 500 | Nil | 72 | 4.5 | 5.4 | No | 23 |
| Thiophene+Coker+S.R | 0.48 | 101 | 425 | 675 | 4.4 | 500 | Nil | 72 | 4.5 | 5.0 | No | 24 |
| Thiophene+Coker+S.R | 1.93 | 95 | 425 | 675 | 5.0 | 500 | Nil | 12 | 17.8 | 5.4 | Yes | 25 |
| $CS_2$+Coker+S.R | 2.12 | 96 | 425 | 675 | 5.0 | 500 | Nil | 12 | 14.5 | 5.0 | Yes | 26 |
| $H_2S$+Coker+S.R | 0.21 | 96 | 225 | 675 | 5.0 | 500 | 3.1 | 16 | 1.7 | 4.1 | No | 27 |
| $H_2S$+Coker+S.R | 0.184 | 85 | 225 | 675 | 2.0 | 500 | 38.6 | 5 | 7.4 | 4.9 | Yes | 28 |
| $H_2S$ | | | 100 | 650 | | Nil | [1] 0.06 | 16 | 117.7 | 6.2 | Yes | 29 |
| $H_2$+$H_2S$ | | | 0 | 800 | | [2] 1.0 | 1.0 | 5 | 7.4 | 6.2 | Yes | 30 |

*S. R. equals straight run naphtha. $CS_2$ equals carbon disulfide. $H_2S$ equals hydrogen sulfide. $H_2$ equals hydrogen.
[1] $H_2S$, s.c.f.m./Cu.ft. catalyst.
[2] $H_2$, S.C.F.M./cu. ft. catalyst.

It is manifest that the data in the last two columns establish that the sulfur content of the presulfided catalyst per se is not indicative of enhanced capability to remove nitrogen from naphtha under the aforedescribed relatively mild conditions. Thus, there are four catalysts which in the presulfided condition contained 4.4 to 5.0 percent by weight of sulfur. Two of them are effective, two are ineffective. Two catalysts in the presulfided condition contained 5.4 percent by weight of sulfur. One is effective, the other is not. But those catalysts which are effective regardless of the sulfur content after treatment are effective when the hydrogen sulfide partial pressure at the reactor inlet is at least 7.4 p.s.i.a. as is recognized by even a cursory inspection of the data presented in Table IX.

Table IX

| Run No. | Sulfur on Catalyst, Percent wt. | $H_2S$ Partial Pressure, p.s.i.a. | Time of Presulfiding, hours | Sulfiding Temp., °F. | Effective Presulfiding |
|---|---|---|---|---|---|
| 21 | 3.3 | 0.2 | 97 | 675 | No. |
| 27 | 4.1 | 1.7 | 16 | 675 | No. |
| 22 | 4.4 | 3.0 | 72 | 675 | No. |
| 28 | 4.9 | 7.4 | 5 | 675 | Yes. |
| 26 | 5.0 | 14.5 | 12 | 675 | Yes. |
| 24 | 5.0 | 4.5 | 72 | 675 | No. |
| 23 | 5.4 | 4.5 | 72 | 675 | No. |
| 25 | 5.4 | 17.8 | 12 | 675 | Yes. |
| 29 | 6.2 | 114.7 | 16 | 650 | Yes. |
| 30 | 6.2 | 7.4 | 5 | 800 | Yes. |

The data presented in Table IX extablish that when activating or enhancing the hydrodenitrogenizing capabilities of hydrogenation catalysts having hydrodesulfurizing and hydrodenitrogenizing capabilities, satisfactory activation or enhancement of the hydrodenitrogenizing capabilities of the catalyst can be obtained at a presulfiding temperature of 650° F. when the concentration of sulfur in the non-oxidized form as organic sulfur compound, e.g., heterocyclic compound such as thiophene, organic disulfides such as carbon disulfide, methyl disulfide or dimethyl disulfide, diphenyl disulfide or phenyl disulfide, sulfhydryls such as hydrogen sulfide, butyl mercaptan, phenyl mercaptan, and, in general, sulfur compounds which are liquid or gaseous at ambient temperatures of about 60° to 80° F. which react with metals or oxides of the fourth, sixth, and eighth series of the sixth group and with metals or oxides of the fourth series of the eighth group of the periodic table, expressed as the partial pressure of hydrogen sulfide is at least 7.4 p.s.i.a. at the vapor inlet of the sulfiding reactor. At the minimum partial pressure of hydrogen sulfide set forth hereinbefore a sulfiding time of at least five hours is required although the sulfiding time can be as long as sixteen hours. The hydrogenation catalyst is contacted with a flowing stream of hydrogen sulfide per se at the rate of at least 0.06 s.c.f. M/cu. ft. of catalyst. The rate of circulation can be higher for dynamic contact of the hydrogenation catalyst with hydrogen sulfide as the sulfiding agent.

Thus, the present invention provides a method for enhancing or increasing the hydrodenitrogenizing capabilities of a hydrogenation catalyst having hydrodesulfurizing and hydrodenitrogenizing capabilities which comprises contacting a hydrogenation catalyst having hydrodesulfurizing and hydrodenitrogenizing capabilities for a period of at least 5 hours with (1) hydrogen and naphtha containing extraneous organic sulfur compounds, (2) hydrogen sulfide alone or with hydrogen, (3) hydrogen sulfide, hydrogen, and naphtha to produce a presulfided base catalyst. The concentration of extraneous organic sulfur compound and hydrogen sulfide expressed as hydrogen sulfide is that which provides a hydrogen sulfide partial pressure at the inlet of the treating zone of at least 7.4 p.s.i.a.. The hydrogenation catalyst is presulfided at a temperature of at least 650° and not higher than about 1150° F. and for at least 5 hours to obtain a presulfided base catalyst.

When a test naphtha containing about 85 to about 105 p.p.m. of nitrogen is contacted with a base catalyst (presulfided as described hereinbefore to provide a presulfided base catalyst) under the following standard test conditions of 425 p.s.i.g. total reactor pressure, a temperature of 675° F., a liquid hourly space velocity of 5.0, and a hydrogen circulation rate of 500 standard cubic feet per barrel of test naphtha (500 s.c.f./b.) as 100 percent hydrogen or the equivalent of hydrogen-containing gas such as reformer gas comprising $C_1$ to $C_3$ hydrocarbons and hydrogen the $C_5$ and heavier product produced contains at least 40 percent less nitrogen than the $C_5$ and heavier product produced when a portion of the same test naphtha is contacted with the unpresulfided base catalyst under the same standard test conditions.

The present invention also provides a method for reforming feed naphtha containing more than about ten p.p.m. of nitrogen which comprises mixing said naphtha containing more than ten p.p.m. of nitrogen with naphtha containing less than ten p.p.m. of nitrogen to obtain a naphtha blend containing not more than 15 p.p.m. of nitrogen, contacting said naphtha blend with particle-form solid hydrogenation catalyst having hydrodesulfurization and hydrodenitrogenizing capabilities after said hydrogenation catalyst, preferably a mixture of oxides of cobalt and molybdenum on alumina support, has been sulfided with sulfur in the non-oxidized form (as defined hereinbefore), at a concentration of said sulfur in non-oxidized form expressed as a partial pressure of hydrogen sulfide of at least 7.4 p.s.i.a., at a temperature of at least 650° F. for at least five hours, under hydrodesulfurizing conditions of 400 to 800 p.s.i.g., temperature within the range of about 650° to about 800°

F., liquid hourly space velocity of 2 to 5, and hydrogen circulation rate of about 300 to about 1000 s.c.f./barrel of said blend naphtha to obtain a hydrodecontaminated blend naphtha reformer feed comprising $C_5$ and heavier hydrocarbons and containing not more than one p.p.m. of nitrogen, contacting said hydrodecontaminated blend naphtha reformer feed with particle-form platinum-group metal reforming catalyst under reforming conditions of temperature, within the range of about 800° to about 1000° F., pressure within the range of about 100 to about 1000 p.s.i.g., and liquid hourly space velocity of about 0.5 to 5.0, and recovering $C_5$ and heavier hydrocarbons having an octane rating higher than the octane rating of the aforesaid feed naphtha.

We claim:

1. A method of presulfiding particle-form hydrogenation catalyst having hydrodesulfurizing and hydrodenitrogenizing capabilities which comprises in a reaction zone contacting particle-form hydrogenation catalyst having hydrodesulfurizing and hydrodenitrogenizing capabilities with sulfur in non-oxidized form in a concentration of at least 7.4 p.s.i.a. measured as hydrogen sulfide at the vapor inlet of said reaction zone, at a temperature of at least 650° F. for at least five hours.

2. The method of presulfiding hydrogenation catalyst having hydrodesulfurizing and hydrodenitrogenizing capabilities as set forth and described in claim 1 wherein the hydrogenation catalyst comprises oxides of cobalt and molybdenum on alumina support, wherein the reaction zone pressure is 100 p.s.i.g., wherein the hydrogen sulfide partial pressure is at least about 7.4 p.s.i.a., and wherein the non-oxidized form of sulfur is hydrogen sulfide.

3. The method of presulfiding hydrogenation catalyst as set forth and described in claim 1 wherein the hydrogenation catalyst comprises oxides of cobalt and molybdenum on alumina support, wherein the reaction zone pressure is at least 400 p.s.i.g., wherein the sulfur in non-oxidized form is an organic compound liquid at ambient temperatures, wherein naphtha is a carrier fluid, wherein the concentration of sulfur expressed as partial pressure of hydrogen sulfide is within the range of about 7.4 to about 40 p.s.i.a., and wherein the sulfiding temperature is at least 650° F.

4. The method of presulfiding hydrogenation catalyst as set forth and described in claim 1 wherein the non-oxidized form of sulfur is carbon disulfide.

5. The method of presulfiding hydrogenation catalyst as set forth and described in claim 1 wherein the non-oxidized form of sulfur is "thiophene."

6. The methhod of presulfiding hydrogenation catalyst as set forth and described in claim 1 wherein the non-oxidized form of sulfur is organic sulfhydryl.

7. The method of presulfiding hydrogenation catalyst as set forth and described in claim 1 wherein the non-oxidized form of sulfur is "organic disulfide."

8. A method of enhancing the hydrodenitrogenizing capabilities of hydrogenation catalyst having hydrodesulfurizing and hydrodenitrogenizing capabilities which comprises contacting a hydrogenation catalyst having hydrodesulfurizing and hydrodenitrogenizing capabilities comprising oxides of cobalt and molybdenum on alumina support with sulfur in non-oxidized form to obtain a sulfided hydrogenation catalyst which, when contacted with test naphtha containing about 95 to about 100 p.p.m. of nitrogen at hydrodenitrogenizing conditions of 675° F., 425 p.s.i.g., liquid hourly space velocity of 5, and hydrogen circulation rate of 500 s.c.f./bbl. of said test naphtha, produces $C_5$ and heavier hydrocarbon product containing at least forty percent less nitrogen than $C_5$ and heavier hydrocarbon product produced from said test naphtha under said hydrodenitrogenizing conditions employing said hydrogenation catalyst without presulfiding.

9. A method of reducing the nitrogen content of a mixture boiling below about 650° F. and of hydrocarbons boiling below about 650° F. which comprises contacting a hydrocarbon mixture containing more than ten parts per million of nitrogen with presulfided hydrogenation catalyst as defined hereinafter under hydrodecontamination conditions of pressure within the range of about 400 to about 800 p.s.i.g., temperature within the range of about 650 to 800° F., liquid hourly space velocity within the range of about 2 to about 5, and hydrogen circulation within the range of about 300 to about 1000 s.c.f./bbl. of said hydrocarbon mixture, and recovering hydrodecontaminated hydrocarbon mixture of reduced nitrogen content, said presulfided hydrogenation catalyst comprising particle-form hydrogenation catalyst having hydrodesulfurizing and hydrodenitrogenizing capabilities, the hydrodenitrogenizing capabilities of which have been enhanced in a presulfiding treatment comprising contacting particle-form hydrogenation catalyst having hydrodesulfurizing and hydrodenitrogenizing capabilities at a temperature of at least about 650° F. when sulfur in non-oxidized form in a concentration expressed as partial pressure of hydrogen sulfide of at least 7.4 p.s.i.a. for at least five hours to obtain a presulfided catalyst which when contacted with test naphtha containing 85 to 105 p.p.m. of nitrogen under hydrodenitrogenizing conditions at 675° F., 425 p.s.i.g., liquid hourly space velocity of 5 and hydrogen circulation of 500 s.c.f./bbl. of the aforesaid test naphtha produces a $C_5$ and heavier product containing at least forty percent less nitrogen than the product produced when contacting the same test naphtha under the same hydrodenitrogenizing conditions with the same catalyst before presulfiding.

10. The method of hydrodecontaminating hydrocarbon mixtures boiling below about 650° F. as set forth in claim 9 wherein the hydrogenation catalyst comprises oxides of cobalt and molybdenum on alumina support.

11. In the method of pretreating contaminated reformer feed to produce hydrodecontaminated reformer feed containing not more than 1 p.p.m. of nitrogen and reforming said hydrodecontaminated feed in the presence of nitrogen-sensitive particle-form solid reforming catalyst wherein reformer feed containing more than 1 p.p.m. of nitrogen is contacted in a pretreater with particle-form solid hydrogenation pretreater catalyst having hydrodesulfurizing and hydrodenitrogenizing capabilities in the presence of at least 300 s.c.f. of hydrogen per barrel of contaminated reformer feed at a pressure of at least 400 p.s.i.g., at a liquid hourly space velocity of about 2 to about 5, at a temperature in the range of about 650° to about 800° F., wherein a pretreater effluent is obtained comprising hydrogen, hydrogen sulfide, ammonia, and $C_1$ and heavier hydrocarbons, wherein sarid pretreater effluent is separated at least into a pretreater gaseous fraction comprising hydrogen, hydrogen sulfide, ammonia, and $C_1$ to $C_4$ hydrocarbons and hydrodecontaminated reformer feed comprising $C_5$ and heavier hydrocarbons containing not more than 1 p.p.m. of nitrogen, wherein said hydrodecontaminated reformer feed is contacted with nitrogen-sensitive particle-form solid reforming catalyst under reforming conditions of temperature, pressure, liquid hourly space velocity, and hydrogen-to-hydrodecontaminated reformer feed mol ratio wherein a reformer effluent comprising hydrogen and $C_1$ and heavier hydrocarbons is obtained, and wherein said reformer effluent is separated into reformer recycle gas and reformer make-gas both comprising hydrogen and $C_1$ to $C_3$ hydrocarbons, light gasoline comprising $C_4$ hydrocarbons, and reformate comprising $C_5$ and heavier hydrocarbons having an octane rating appreciably higher than the octane rating of said hydrodecontaminated reformer feed, the improvement which comprises contacting particle-form solid hydrogenation catalyst having hydrodesulfurizing and hydrodenitrogenizing capabilities at a temperature of at least 650° F. with sulfur in non-oxidized form in a concentration expressed as partial pressure of hydrogensulfide of at least 7.4 p.s.i.a. for at least five hours, and obtaining presulfided particle-form solid hydrogenation catalyst having enhanced hydrodenitrogenizing capabilities and employing the aforesaid presulfide particle-form solid hydrogenation catalyst having enhanced hydrodenitrogenizing capabilities as a pretreater catalyst.

12. The method set forth and described in claim 11 wherein the presulfided particle-form solid hydrogenation catalyst having enhanced hydrodenitrogenizing capabilities is further characterized that when said presulfided hydrogenation catalyst is contacted with test naphtha, containing 85 to 105 p.p.m. of nitrogen under hydrodenitrogenizing conditions of temperature of 675° F., pressure of 425 p.s.i.g., liquid hourly space velocity of 5, and hydrogen circulation of 500 s.c.f./barrel of the aforesaid test naphtha, the $C_5$ and heavier hydrocarbon product produced contains at least forty percent less nitrogen than the $C_5$ and heavier hydrocarbon product produced when contacting the aforesaid test naphtha under the same hydrodenitrogenizing conditions with the same hydrogenation catalyst before presulfiding.

13. The method set forth and described in claim 11 wherein the particle-form solid hydrogenation catalyst having hydrodesulfurizing and hydrodenitrogenizing capabilities consists essentially of oxides of cobalt and molybdenum on alumina support.

14. The method set forth and described in claim 11 wherein the particle-form solid hydrogenation catalyst having hydrodesulfurizing and hydrodenitrogenizing capabilities consists essentially of oxides of cobalt and molybdenum on alumina support and wherein the nitrogen-sensitive particle-form solid reforming catalyst comprises about 0.35 to about 0.6 percent by weight of platinum and about 0.4 to about 0.7 percent by weight of chlorine on alumina support.

15. The method set forth and described in claim 14 wherein the particle-form solid hydrogenation catalyst consists essentially of a mixture of oxides of cobalt and molybdenum on alumina support and containing not more than one percent by weight of deposited carbonaceous material, wherein the aforesaid hydrogenation catalyst is contacted with a vaporous mixture of naphtha at a liquid hourly space velocity of about 2 and hydrogen at a rate of about 500 s.c.f. of hydrogen per barrel of said naphtha for at least five hours under a total pressure in the range of about 225 to about 250 p.s.i.g. at a temperature in the range of about 650° to about 800° F., and wherein hydrogensulfide is admixed with said vaporous naphtha and hydrogen at a rate of at least about 40 s.c.f. of hydrogensulfided per barrel of said naphtha.

References Cited in the file of this patent
UNITED STATES PATENTS

| | | |
|---|---|---|
| 2,937,134 | Bowles | May 17, 1960 |
| 3,016,346 | O'Hara | Jan. 9, 1962 |

UNITED STATES PATENT OFFICE
CERTIFICATE OF CORRECTION

Patent No. 3,140,994

July 14, 1964

Walter Rodman Derr, Jr., et al.

It is hereby certified that error appears in the above numbered patent requiring correction and that the said Letters Patent should read as corrected below.

Column 3, Table II, under the heading "Wt. percent $^1$S", and opposite "D", for "44" read -- 4.4 --; same column 3, line 59, for "(100%)" read -- (100%) --; columns 7 and 8, Table VIII, under the heading "LHSV" and opposite "S. R.*" for "2.75" read -- 3.75 --; same table, under the heading "H$_2$S Partial Pressure p.s.i.a.", and opposite "H$_2$S", for "117.7" read -- 114.7 --; column 10, line 50, for "sarid" read -- said --.

Signed and sealed this 17th day of November 1964.

(SEAL)
Attest:

ERNEST W. SWIDER
Attesting Officer

EDWARD J. BRENNER
Commissioner of Patents